United States Patent [19]
Howard

[11] 4,112,631
[45] Sep. 12, 1978

[54] ENCAPSULATED ABRASIVE GRAINS AND ARTICLES MADE THEREFROM

[75] Inventor: Robert N. Howard, Stillwater, Minn.

[73] Assignee: Minnesota Mining and Manufacturing Company, St. Paul, Minn.

[21] Appl. No.: 364,671

[22] Filed: May 29, 1973

[51] Int. Cl.² ............ B24D 3/06; B24D 3/24
[52] U.S. Cl. ............ 51/295; 51/298 A; 51/301; 264/4
[58] Field of Search ............ 51/295, 298, 302, 306, 51/296, 301; 264/4

[56] References Cited

U.S. PATENT DOCUMENTS

| | | | |
|---|---|---|---|
| 2,806,772 | 9/1957 | Robie | 51/296 |
| 2,904,419 | 9/1959 | Couch et al. | 51/295 |
| 2,986,455 | 5/1961 | Sandmeyer | 51/296 |
| 3,202,533 | 8/1965 | Sachsel | 264/4 |
| 3,502,453 | 3/1970 | Baratto | 51/295 |
| 3,692,690 | 9/1972 | Horger | 264/4 |
| 3,816,331 | 6/1974 | Brown et al. | 264/4 |

Primary Examiner—Donald J. Arnold
Attorney, Agent, or Firm—Cruzan Alexander; Donald M. Sell; Richard E. Brink

[57] ABSTRACT

A capsule containing fine abrasive grains dispersed in a liquid or low melting solid grinding aid can be substituted for conventional abrasive polishing grains. A novel coated abrasive structure is made by bonding such capsules to a backing sheet.

6 Claims, 1 Drawing Figure

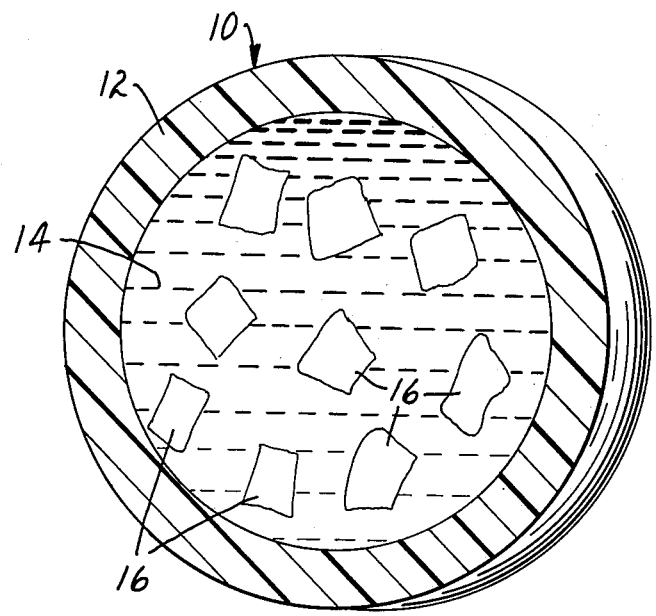

ENCAPSULATED ABRASIVE GRAINS AND ARTICLES MADE THEREFROM

BACKGROUND OF THE INVENTION

This invention relates to slurries of fine abrasive and their use.

Polishing operations are commonly performed by continuously feeding an excess of a fine abrasive-lubricant slurry to the entire surface of a rotary flat lap while forcing a workpiece against the slurry-covered surface. This process understandably wears away the lap surface, which must be periodically refinished. Many particles slide off the lapping surface too quickly to be used. Since the slurry is usually recirculated to minimize cost, the initially fine abrasive particles become even smaller as they are used, resulting in decreased abrading efficiency and a constantly changing finish on the workpiece.

Fine abrasive particles are also difficult to use in coated abrasive structures. It is difficult to prepare a product having consistent abrading features; further, the surface grain dulls during use and the lower-situated grain remains out of contact with the workpiece, the coating thickness typically being twice the diameter of each individual grain. Extremely small abrasive grains, e.g., 3-micron particles, are present in such thin abrasive coatings that the entire coated abrasive structure may be destroyed as the result of inadvertent gouging or snagging. Where the backing is cloth, such grains may also be forced into the backing rather than into the workpiece.

Effective utilization of fine abrasive grains has thus always posed a problem to manufacturers and users of both polishing slurries and coated abrasive products. One method of using fine particles has been to disperse the particles in a softer, lower-melting inorganic material to form a composite granule; see U.S. Pat. No. 2,849,305 in which titanium carbide grains are dispersed in a fused alumina-titania matrix and the resulting composite crushed and cooled.

SUMMARY OF THE INVENTION

The present invention solves the problems noted hereinbefore and provides a novel encapsulated abrasive-lubricant slurry which is simple to manufacture and which can utilize a wide variety of abrasive grains and lubricants. The capsules of this invention, which provide an efficient means of handling fine grain abrasive, are essentially spherical, making them easily handled and dispersed as abrasive in a carrier liquid for lapping. They also conveniently combine both grinding aid and abrasive intimately mixed in predetermined proportions insuring uniformity of performance. Unbroken capsules are considerably larger than the individual encapsulated abrasive grains, and hence more easily separated from the carrier liquid for salvage.

In coated abrasive constructions the relatively large capsules are substituted for the fine abrasive grains, resulting in a thicker, more score-resistant abrasive coating than could otherwise be obtained. In use, the capsules gradually rupture, and the abrasive not being held in place by the make coat resin provides a loose grain finish with the convenience of a coated abrasive. Where a low melting solid, e.g. wax or pitch, is used as the lubricant, or grinding aid, a liquid can be introduced to the work surface to remove swarf without concurrently removing the abrasive mineral. The capsules also provide a means for using corrosive or toxic grinding aids without danger to workmen and machines, since the grinding aid is not handled as a separate liquid.

The capsules, which contain both fine abrasive grains and liquid or low-melting grinding aids, can be made substantially spheroidal and have moderate diameters, e.g. 10 – 200 microns. The smaller capsules, e.g., 10 – 30 microns, are, of course, suitable for use with the smaller abrasive grains, e.g., 0.5 to 5 microns. Larger capsules, however, may include either fine or coarse abrasive grains. In all cases, however, the capsule will be at least twice the size of the encapsulated abrasive grain, so that a plurality of abrasive grains are generally present in the capsule. The capsules will normally be spherical; this shape is preferred because of ease in handling. Ellipsoidal or irregularly rounded capsules are also satisfactory.

The abrasive grains to be encapsulated may include such well known abrasive grains as silicon carbide, aluminum oxide, boron carbide, as well as other abrasive grains and mixtures thereof. The abrasive granules of this invention are particularly suited for use with expensive, difficult-to-disperse abrasive grains such as diamond or cubic boron nitride.

The abrasive grains to be encapsulated will range in size from submicron, i.e., $\frac{1}{2}$ micron or less, up to 25 microns in diameter. The abrasive grains will generally have a diameter of less than about 25 microns; grains larger than 25 microns can be coated on abrasive articles or used in slurries to form useful materials without the need of encapsulation. In the present invention, the most preferred abrasive grains are those having a nominal diameter of 15 microns or less, since these finer abrasives are more difficult to use in coated abrasive articles and benefit the most from being encapsulated.

The abrasive grains or grains to be used are mixed or dispersed into a grinding aid, e.g., grinding oil or lubricant. The term "grinding aid" is intended to embrace non-abrasive liquids or low melting solids which reduce the force required to abrade or reduce the frictional force between the work piece and abrasive. Examples of suitable grinding aids are the trademarked oil "Vantrol" and other low viscosity, high flash oils; "Almag" diamond saw lubricant, a trademarked product of Texaco; carnauba wax; oleic acid; water-soluble oils, e.g., "Cindol"; glycerols; petroleum oil; chlorinated hydrocarbons; paraffin; and pitch. For polishing such materials as zinc, silicon, or aluminum, acidic or basic materials (e.g. $NaHSO_4$ or $NaOH$) may be employed as grinding aids.

The abrasive grain to grinding aid weight ratios for relatively inexpensive common abrasives such as silicon carbide and aluminum oxide will be generally 40% mineral-60% grinding aid to 60% mineral-40% grinding aid. These ratios represent up to about 10 – 30% by volume of abrasive mineral, the amount of mineral being chosen within this range to maximize the abrasive action and facilitate encapsulation of the abrasive slurries.

For more expensive abrasive grains, e.g., cubic boron nitride or diamond, the abrasive to grinding aid ratio will normally range from one part abrasive:two parts grinding aid to one part abrasive:five parts grinding aid by weight, which corresponds to approximately 5 – 15% by volume of abrasive. The amount of expensive abrasive chosen is lower in order to provide sufficient abrasive action while minimizing the cost to the user.

Encapsulation of liquids is known; see, for example, U.S. Pat. Nos. 3,429,827; 3,624,248; 3,607,776;

3,575,882; 3,574,133; 3,565,818; 3,492,380; and 3,270,100. These patents deal with the encapsulation of liquid in a hollow spherical shell or in the successive encapsulation of one or more liquids in multiple shell walls, to provide dry spherules in which the liquid or liquids become available for use upon rupture of the shell wall.

It is also known to encapsulate grinding aids and incorporate them in abrasive articles; see U.S. Pat. No. 3,502,453.

In interfacial encapsulation, a pair of complementary condensate-forming materials are in two separate substantially immiscible liquids. When one of the liquids is dispersed in the other, droplets form and a shell wall condenses around the dispersed droplets thus enclosing them in capsules.

The abrasive-grinding aid slurry is typically encapsulated by adding thereto a solution of a first reactant which is capable of reacting with a second reactant in an interfacial encapsulation process. A mixture of slurry and first reactant is introduced into the second reactant solution with agitation. The mixture dispenses as droplets, around which the first and second reactants form shell walls enclosing the mixture droplets.

Suitable materials for forming capsule shell walls can be found in the encapsulation patents cited hereinbefore. Examples of shell walls which are useful in this invention include gelatin, polyethylene oxide, styrene:-maleic:anhydride:, cellulose acetate phthalate, polyamides, polyesters, see U.S. Pat. No. 3,429,827; 3,607,776; polyureas, see U.S. Pat. No. 3,575,882; poly(vinylalcohol), see U.S. Pat. No. 3,574,133; polyurethane, see U.S. Pat. No. 3,270,100; as well as polymerized monomers, e.g. acrylonitrile, methylmethacrylate, xylylene monomers, etc. see U.S. Pat. No. 3,427,250 and the well known urea-formaldehyde encapsulation processes. The resulting abrasive capsules are filtered from the reactant liquid and ready for use as part of a slurry or for bonding to a backing in accordance with standard coated abrasive technology, merely substituting the capsules for conventional abrasive grains.

When substituting the capsules for abrasive grains in a coated abrasive or other abrasive article, the resins used for forming the abrasive article should not cause the release of the ingredients prior to use in polishing operations.

BRIEF DESCRIPTION OF THE DRAWING

In the accompanying drawing, the single FIGURE shows an abrasive capsule of this invention in partial section.

DESCRIPTION OF THE PREFERRED EMBODIMENTS

An example of an abrasive capsule of this invention is shown in the single FIGURE. An abrasive capsule 10 has a plurality of abrasive grains 16 dispersed throughout grinding aid 14 encapsulated by shell wall 12.

This invention is further illustrated by the following examples. All percentages and parts are by weight unless otherwise noted.

EXAMPLE 1

Preparation of lubricant-abrasive capsules

A urea-formaldehyde precondensate was formed by blending 20 grams of urea and 54 grams of 37% formaldehyde in water, adding 0.4 ml. tetraethylene amine to render the system basic and slowly stirring the mixture for 1 hour at 70° C. The system was then diluted with 92 ml. of water and the temperature lowered to about 30° C.

An oil-abrasive slurry containing 40 grams of "Vantrol" 5551-A and 10 grams of 3 micron diamond was added to the system and 50 ml. water and 1.8 ml. 9% hydrochloric acid added immediately thereafter. The resulting mixture was stirred rapidly to form droplets of the oil-abrasive slurry and the temperature raised to 40° C. over a 2 hour period and maintained at 40° C. for an additional 2 hours while continuing agitation. In the warm acidic environment the urea-formaldehyde condensed into shell walls enclosing the slurry.

The solution was then neutralized using 5 grams of 8% sodium acetate, after which the capsules were filtered and washed several times in clear water. The diameter of the capsules ranged from 5 to 150 microns. The capsule diameter can be lowered by increasing, or raised by decreasing, the rate of agitation.

MANUFACTURE OF COATED ABRASIVE PRODUCTS.

A slurry of capsules and base-catalyzed phenolic resin containing 3 parts capsules to one part resin by weight, having a viscosity of about 350 centipoise, was knife coated onto a standard fine grade diamond cloth (35% cotton-65% polyester, plain weave) at a knife setting of four mils. The material was air dried at 80° C. and cured for 10 hours at 100° C.

The coated abrasive of this example looks like a coarser grade product than the 3-micron component abrasive grains; it resembled a normal grade 220 coated abrasive. The upper layer of capsules can be ruptured by a finger. The physical characteristics, e.g., flexibility, thickness, and handleability, were comparable to a conventionally prepared coated abrasive.

The coated abrasive was found to be very useful for machine polishing silicon wafers, supporting the wafers on a flat substrate and abrading them with an oscillating disc having the coated abrasive of this example adhered to its lower surface. The coated abrasive of this example offers a surface which conforms to the shape of the work piece, and the contained diamond slurry produces a fine finish.

EXAMPLE 2

The procedure of Example 1 was repeated, substituting a abrasive-grinding aid slurry comprising 9 micron aluminum oxide abrasive and oleic acid in a 1:1 weight ratio of abrasive to grinding aid.

The capsules were combined with urethane-phenoxy adhesive to form a mixture, the ratio of capsules to resin solids being 3:1 by weight. The resin comprises 70 parts hydroxyterminated polyester having an equivalent weight of about 15,000 and 30 parts of bisphenol A diluted to 35% total solids in methyl ethyl ketone. The resin is activated with "PAPI" (polyphenylpolyarylpolyisocyanate) using one part "PAPI" per 10 parts resin.

Magnetic recording heads made of brass and stainless steel were then hand lapped using the coated abrasive of this example to polish the surface and bring the heads to their finished dimension. Heads lapped with the coated abrasive of this example had a finer, more uniform surface finish when visually compared to heads lapped on a standard lapping film where 9 micron aluminum oxide was coated without encapsulation.

The lubricant present in the capsules lessened the frictional forces between the lapping film and recording head during lapping, making lapping easier than with the conventional lapping film.

EXAMPLE 3

The abrasive capsules of Example 1 were substituted for the abrasive capsules of Example 2 and the procedure of Example 2 followed to form a film-backed coated abrasive.

The coated abrasive was cut into the shape of an annulus. A nickel plated computer memory disc was mounted on a spindle and the abrasive rotateably mounted in contact with the disc surface. The memory disc and abrasive were rotated in contact to polish the disc surface using the following conditions:
  memory disc speed: 40 rpm
  coated abrasive speed: 1000 rpm
  coated abrasive size: 4¼ inch outer diameter by 2½ inch center hole
  total load: 23 pounds
Kerosene lubricant was applied at the surface being abraded during polishing.

After a 3 minute polish period the disc finish was measured using a "Tallysurf." The machine gave a reading of about 1.0 microinch centerline average. Readings below 1.0 microinch are good. The finish produced by a comparable conventional 3-micron diamond lapping film used on the same equipment in the same manner gave a surface reading which was at least three times higher.

EXAMPLE 4

Formation of Wax-Abrasive Beads

Carnauba wax having a melting point of 78° C. was melted and 3-micron aluminum oxide added to form an evenly dispersed slurry, the wax:aluminum oxide ratio being 1:1 by weight.

Water containing a small amount of "Alconox" surfactant was heated to 90° C., stirred vigorously, and the wax:mineral slurry slowly added, the wax forming small droplets about the mineral.

The heat source was removed, the temperature reduced to about 85° C. and room temperature water was added to rapidly cool the mixture and prevent fusion of the wax beads to one another.

Encapsulation of Wax-Abrasive Beads

The encapsulation procedure of Example 1 was repeated, substituting the wax:mineral beads for the oil-abrasive slurry and using NaOH to neutralize the solution.

The encapsulated wax-mineral beads were screened, and capsules having a diameter of 75 microns and smaller were chosen. The capsules were dispersed in the urethane phenoxy resin of Example 2, using a weight ratio of 3 parts capsules to one part resin solids. The dispersion was thinned with methyl ethyl ketone to a viscosity of about 350 centipoise and knife-coated on a polyester film backing using a knife opening of 3 mils. The coated material was cured for 10 hours at 70° C.

The coated abrasive of this example was compared with standard 3 micron aluminum oxide lapping film in the polishing of brass and stainless steel work pieces, using the lapping technique of Example 2.

The coated abrasive of this example conformed to the face of the workpiece and produced a better visual finish.

What is claimed is:

1. A coated abrasive product in which a layer of capsules is bonded to a flexible sheet backing by a cured binder, said capsules being spheroidal and containing a plurality of abrasive grains dispersed in a lubricant, the abrasive grains having a nominal diameter of from about 0.5 to 25 microns and constituting about 5–30% by volume of capsule content, the diameter of said capsules being in the range of about 10–200 microns and at least about twice the nominal diameter of said abrasive grains, the capsule walls consisting of gelatin or resinous materials formed by interfacial encapsulation.

2. In a coated abrasive article comprising abrasive grains bonded to a supporting substrate by a resin, the improvement which comprises: using as the sole source of abrasive grains, spheroidal capsules each containing a plurality of abrasive mineral particles dispersed in a lubricant, the abrasive mineral particles having a nominal diameter of from about 0.5 to about 25 microns, the diameter of said capsules being in the range of about 10 to 200 microns and at least about twice the nominal diameter of said abrasive mineral particles, whereby a coated abrasive is formed which provides a polish similar to that achieved with a loose abrasive grain while affording the handling properties of a coated abrasive article.

3. The coated abrasive of claim 2, wherein the abrasive mineral is diamond.

4. The coated abrasive of claim 2, wherein the lubricant is wax.

5. The coated abrasive of claim 2, wherein the lubricant is a liquid.

6. The coated abrasive of claim 2 wherein the abrasive material is aluminum oxide.

* * * * *